(12) United States Patent
Beard

(10) Patent No.: US 8,967,022 B2
(45) Date of Patent: Mar. 3, 2015

(54) DRIVE MECHANISM

(76) Inventor: Brian Beard, Franklin, MI (US)

( * ) Notice: Subject to any disclaimer, the term of this patent is extended or adjusted under 35 U.S.C. 154(b) by 792 days.

(21) Appl. No.: 13/144,556

(22) PCT Filed: Jan. 15, 2010

(86) PCT No.: PCT/US2010/021103
§ 371 (c)(1),
(2), (4) Date: Jul. 14, 2011

(87) PCT Pub. No.: WO2010/083353
PCT Pub. Date: Jul. 22, 2010

(65) Prior Publication Data
US 2011/0271777 A1    Nov. 10, 2011

Related U.S. Application Data

(60) Provisional application No. 61/145,204, filed on Jan. 16, 2009, provisional application No. 61/161,137, filed on Mar. 18, 2009.

(51) Int. Cl.
*B62M 3/00*      (2006.01)
*F16H 1/06*      (2006.01)
*B62K 3/00*      (2006.01)
*A63B 21/00*     (2006.01)
*A63B 22/20*     (2006.01)
(Continued)

(52) U.S. Cl.
CPC .............. *B62K 3/002* (2013.01); *A63B 21/157* (2013.01); *A63B 22/205* (2013.01); *B62M 1/30* (2013.01); *F16H 31/001* (2013.01); *A63B 69/16* (2013.01); *A63B 2022/0641* (2013.01); *A63B 2069/164* (2013.01); *A63B 2069/168* (2013.01); *A63B 2208/0204* (2013.01)

USPC .......................... 74/665 R; 74/413; 74/594.2

(58) Field of Classification Search
USPC ......... 74/413, 594.2; 280/236–238, 251, 252, 280/260, 261, 288.1
See application file for complete search history.

(56) References Cited

U.S. PATENT DOCUMENTS 4,132,428 A * 1/1979 Lassiere ..................... 280/278
4,206,660 A * 6/1980 Brown ............................ 74/393
(Continued)

FOREIGN PATENT DOCUMENTS

EP    1004501 A1 *  5/2000   ............... B62M 1/04
FR    802435          9/1936
(Continued)

OTHER PUBLICATIONS

International Search Report & Written Opinion for PCT Application No. PCT/US2010/021103 mailed on Apr. 8, 2010.
(Continued)

*Primary Examiner* — Ha D Ho
(74) *Attorney, Agent, or Firm* — Carlson, Gaskey & Olds, P.C.

(57) ABSTRACT

A drive mechanism (20) including a first shaft (324) having a first fixed gear (328) and a second shaft (322) having second fixed gear (330) that engages the first fixed gear to cause the first shaft to rotate in an opposite direction than the second shaft. A first linkage (368) connecting the first shaft and the third shaft and includes a first one-way gear (336). A second linkage (366) connecting the second shaft and the third shaft and includes a second one-way gear (338). The third shaft outputs a unidirectional rotational motion.

18 Claims, 7 Drawing Sheets

(51) Int. Cl.
  *B62M 1/30* (2013.01)
  *F16H 31/00* (2006.01)
  *A63B 69/16* (2006.01)
  *A63B 22/06* (2006.01)

(56) References Cited

U.S. PATENT DOCUMENTS

| | | | | |
|---|---|---|---|---|
| 5,100,125 | A * | 3/1992 | Uplinger et al. | 271/233 |
| 5,228,710 | A * | 7/1993 | Lu | 280/260 |
| 5,765,847 | A * | 6/1998 | Toronto et al. | 280/237 |
| 5,901,973 | A * | 5/1999 | Warren | 280/260 |
| 5,917,995 | A * | 6/1999 | Ota | 358/1.12 |
| 6,000,707 | A * | 12/1999 | Miller | 280/288.1 |
| 6,475,122 | B2 * | 11/2002 | Wu | 482/57 |
| 6,695,332 | B1 * | 2/2004 | Kang | 280/237 |
| 6,790,162 | B1 * | 9/2004 | Ellis et al. | 482/51 |
| 6,945,915 | B2 * | 9/2005 | Wu | 482/57 |
| 7,048,289 | B2 * | 5/2006 | Lau | 280/252 |
| 7,048,290 | B2 * | 5/2006 | Paquette | 280/252 |
| 2002/0152836 | A1 | 10/2002 | Wang | |
| 2003/0173755 | A1 * | 9/2003 | Lachenmayer | 280/252 |
| 2005/0221926 | A1 * | 10/2005 | Naude | 474/8 |
| 2008/0190701 | A1 * | 8/2008 | Stavropoulos | 185/40 R |
| 2009/0066053 | A1 | 3/2009 | Yan | |
| 2011/0271777 | A1 * | 11/2011 | Beard | 74/25 |
| 2011/0275484 | A1 * | 11/2011 | Beard | 482/51 |

FOREIGN PATENT DOCUMENTS

| | | | |
|---|---|---|---|
| FR | 2830831 A1 * | 4/2003 | B62M 1/04 |
| JP | 59-118527 | 7/1984 | |
| WO | 2007/139297 | 12/2007 | |
| WO | WO 2007139297 A1 * | 12/2007 | |

OTHER PUBLICATIONS

International Preliminary Report on Patentability for PCT Application No. PCT/US2010/021103 mailed Jul. 28, 2011.

* cited by examiner

US 8,967,022 B2

DRIVE MECHANISM

This application is a United States National Phase Application of PCT Application No. PCT/US2010/021103 filed on Jan. 15, 2010, which claims priority to U.S. Provisional Application No. 61/145,204 filed on Jan. 16, 2009 and U.S. Provisional Application No. 61/161,137 filed on Mar. 18, 2009.

BACKGROUND OF THE INVENTION

This disclose generally relates to a drive mechanism. More particularly, this disclosure relates to a drive mechanism for producing a unidirectional rotational output from multiple inputs.

SUMMARY OF THE INVENTION

A drive mechanism includes a first shaft having a first fixed gear and a second shaft having a second fixed gear that engages the first fixed gear to cause the first shaft to rotate in an opposite direction than the second shaft. A first linkage connects the first shaft and a third shaft and includes a first one-way gear. A second linkage connects the second shaft and the third shaft and includes a second one-way gear. The third shaft outputs a unidirectional rotational motion.

BRIEF DESCRIPTION OF THE DRAWINGS

These and other features of the present invention can be best understood from the following specification and drawings, the following of which is a brief description.

DETAILED DESCRIPTION OF THE PREFERRED EMBODIMENT

Figure 1:
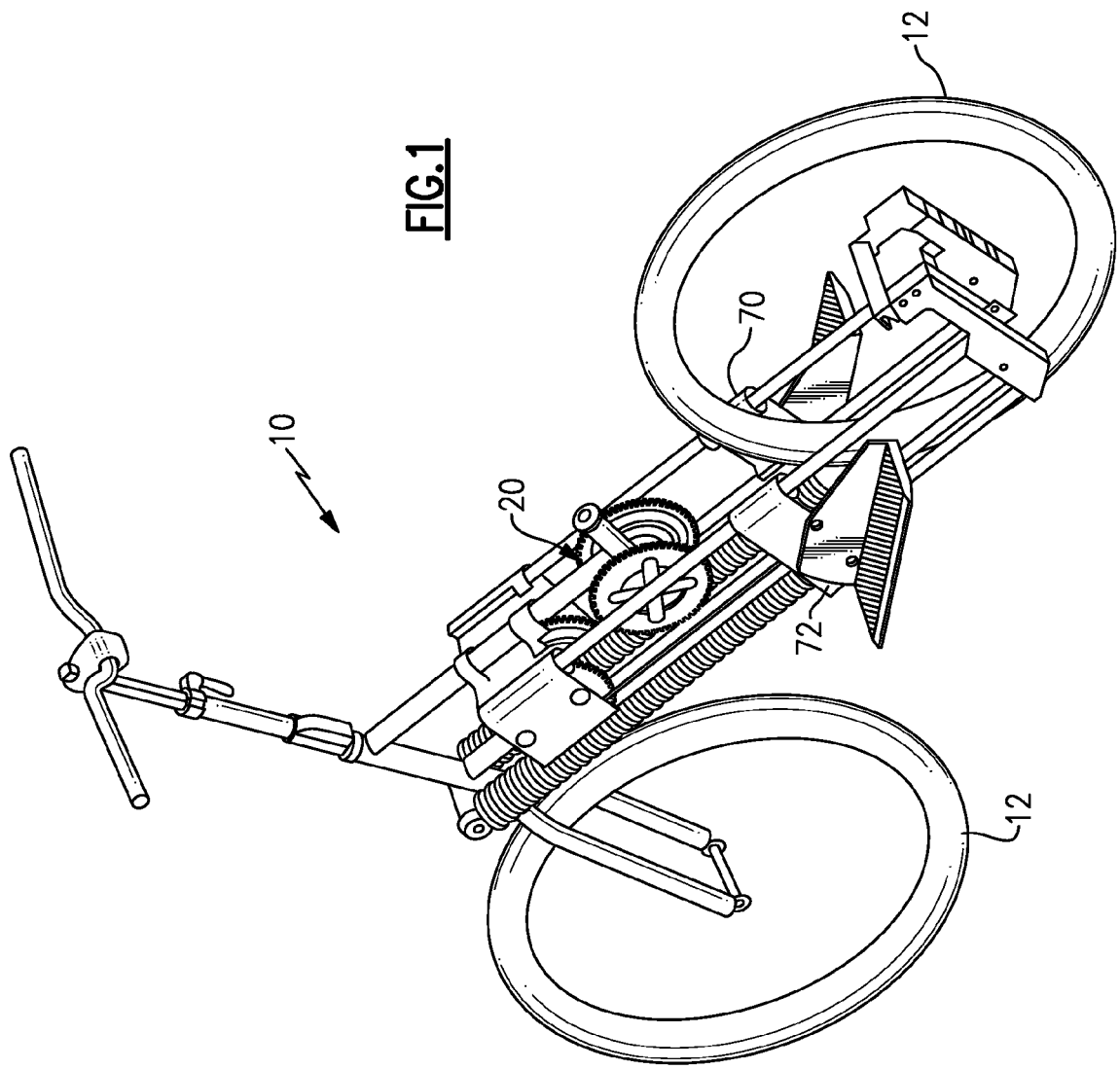
FIG. 1 is a perspective view of a vehicle including an example drive mechanism.

FIG. 1 is a perspective view of a vehicle 10. The vehicle 10 includes wheels 12 and an example drive mechanism 20. A first input member 70 and a second input member 72 are mechanically linked to the drive mechanism to transfer a reciprocating linear input motion into a unidirectional rotational output motion.

Figure 2:
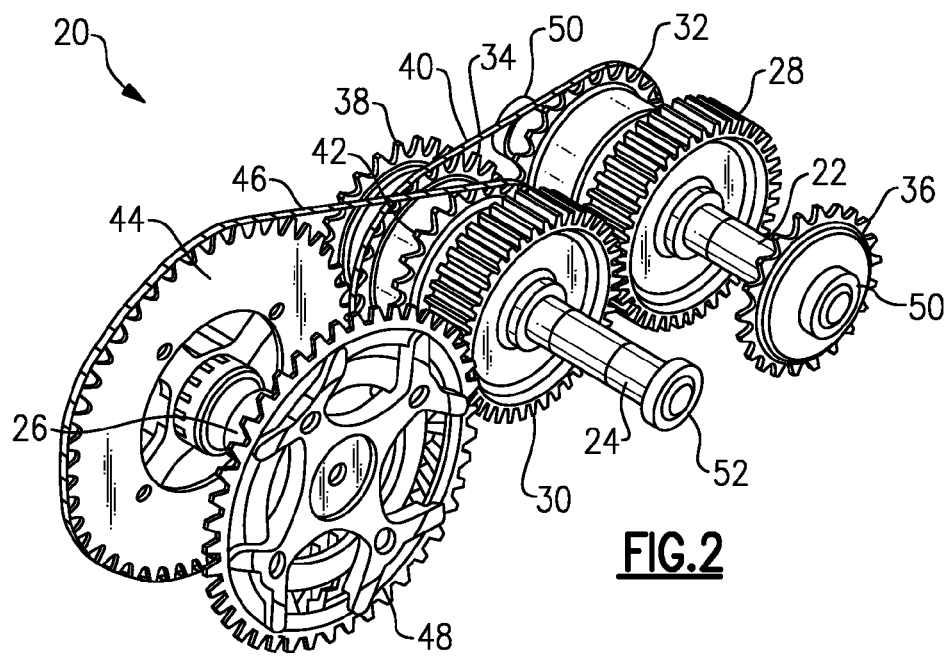
FIG. 2 is a perspective view of the example drive mechanism.

FIG. 2 is a perspective view of the example drive mechanism 20. The drive mechanism 20 includes a first shaft 22, a second shaft 24, and a third shaft 26. The first shaft 22 includes a first input gear 36, a first fixed gear 28, and a first one-way gear 32. The second shaft 24 includes a second fixed gear 30, a second input gear 38, a second one-way gear 34, and an attachment gear 42. The attachment gear 42 engages and moves with the second one-way gear 34. The third shaft 26 includes a drive gear 44 and an optional output gear 48.

The first shaft 22 is mechanically linked to the second shaft 24 by teeth on the first fixed gear 28 that engage teeth on the second fixed gear 30. The first and second fixed gears 28 and 30 may be spur gears, helical gears, or other suitable gears capable of mechanically linking the first shaft 22 and the second shaft 24 to cause the first shaft 22 and the second 24 to rotate in opposite directions.

The first one-way gear 32 is mechanically linked to the second one-way gear 34 by a one-way gear link 40. The attachment gear 42 is mechanically linked to the drive gear 44 by an output link 46. The first and second one-way gears 32 and 34, the attachment gear 42, the drive gear 44, and the output gear 48 may be sprockets or pulleys and the one-way gear link 40 and the output link 46 may be a chain or a belt, respectively. The one-way gears fixedly engage a shaft when rotated relative to the shaft in a first direction and freely rotate relative to the shaft in a second direction.

Figure 3:
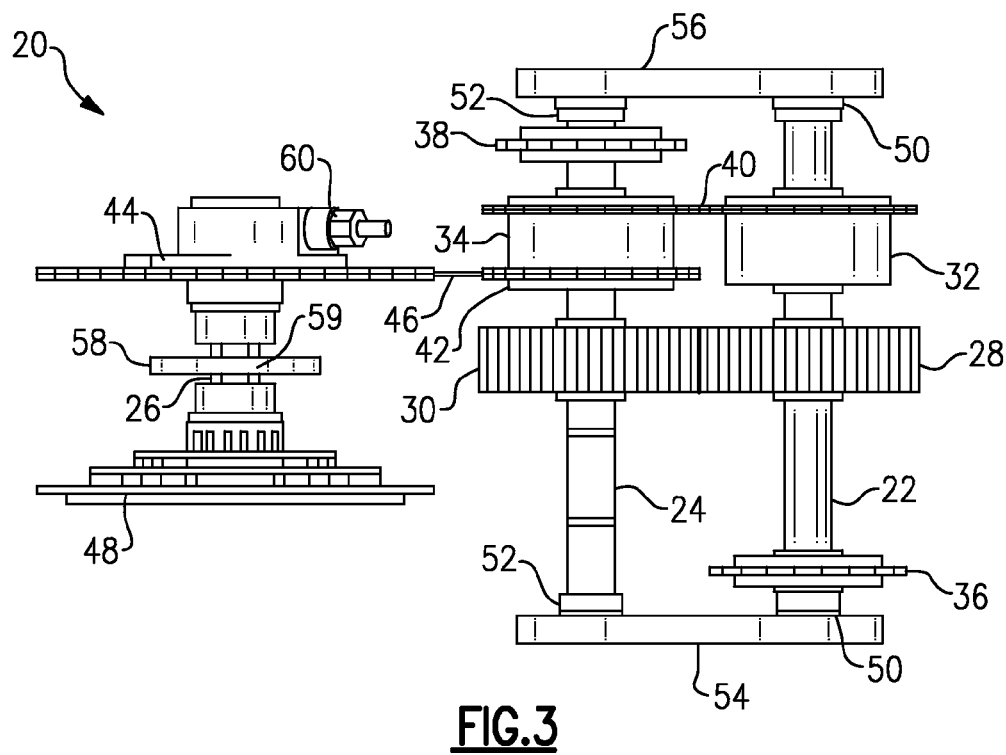
FIG. 3 is a top view of the drive mechanism of FIG. 2.

FIG. 3 is a top view of the drive mechanism 20. The first shaft 22 and the second shaft 24 are mounted within a first housing member 54 and a second housing member 56. The first shaft 22 is attached to the first and second housing members 54 and 56 by a first pair of bearings 50. The second shaft 24 is attached to the first and second housing members 54 and 56 by a second pair of bearings 52. The third shaft 26 is attached to a third housing member 58 by a third shaft bearing 59. Although the first, second, and third housing members 54, 56, and 58 are shown as separate elements, one of ordinary skill in the art could recognize that the first, second, and third housing members 54, 56, and 58 could be formed into a single housing.

Figure 4:
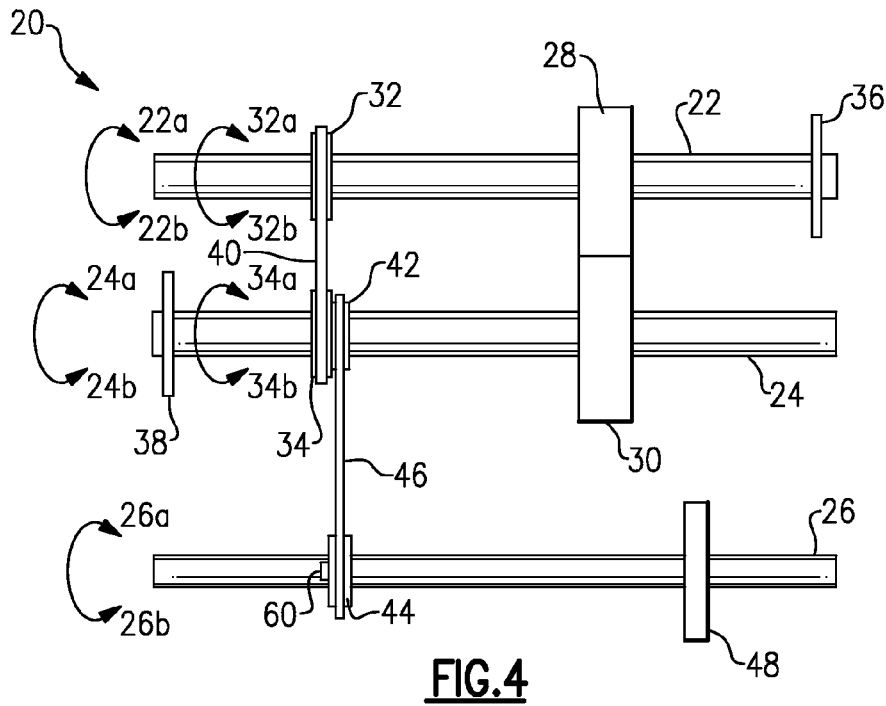
FIG. 4 is a schematic view of the drive mechanism of FIG. 2.

FIG. 4 is a schematic view of the drive mechanism 20. When the first shaft 22 rotates in a first direction 22a the first fixed gear 28 engages the second fixed gear 30 to cause the second shaft 24 to rotate in a second direction 24b. The first one-way gear 32 rotates in a first direction 32a, the second one-way gear 34 rotates in a first direction 34a, and the second shaft 24 rotates in a second direction 24b that is opposite the first direction 34a. The attachment gear 42 rotates with the second one-way gear in the first direction 34a and causes the third shaft 26 to rotate in a first direction 26a.

When the first shaft 22 rotates in a second direction 22b and the second shaft 24 rotates in a first direction 24a, the first one-way gear 32 rotates in the first direction 32a and free spins on the first shaft 22 and the second one-way gear 34 rotates in the first direction 34a. The attachment gear 42 rotates with the second one-way gear 34 in the first direction 34a and causes the third shaft 26 to rotate in the first direction 26a. A release mechanism 60 engages or disengages the drive gear 44 from the third shaft 26 to allow the third shaft 26 to rotate independently of the first and second shafts 22 and 24. The release mechanism 60 in this example may be a clutch, a locking member, or another similar engaging device.

Since the first shaft 22 and the second shaft 24 rotate in opposite directions, an input to the first shaft 22 and the second shaft 24 must either be applied individually or simultaneously 180 degrees out of phase.

Figure 5:
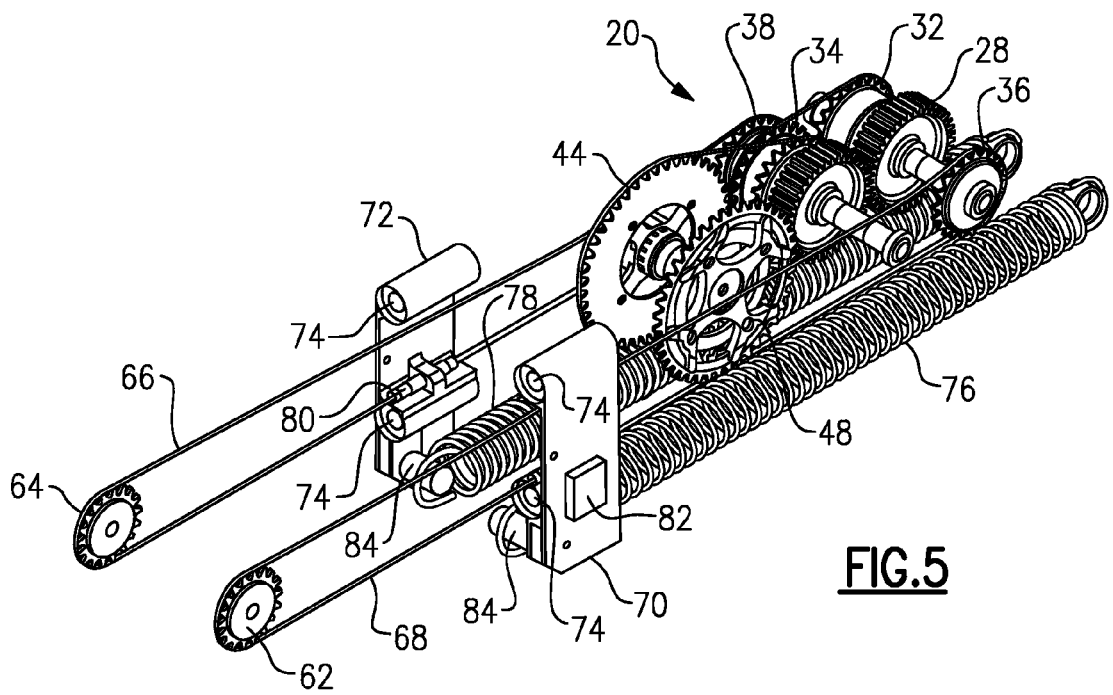
FIG. 5 is a perspective view of the drive mechanism of FIG. 2 with an example input device.
Figure 6:
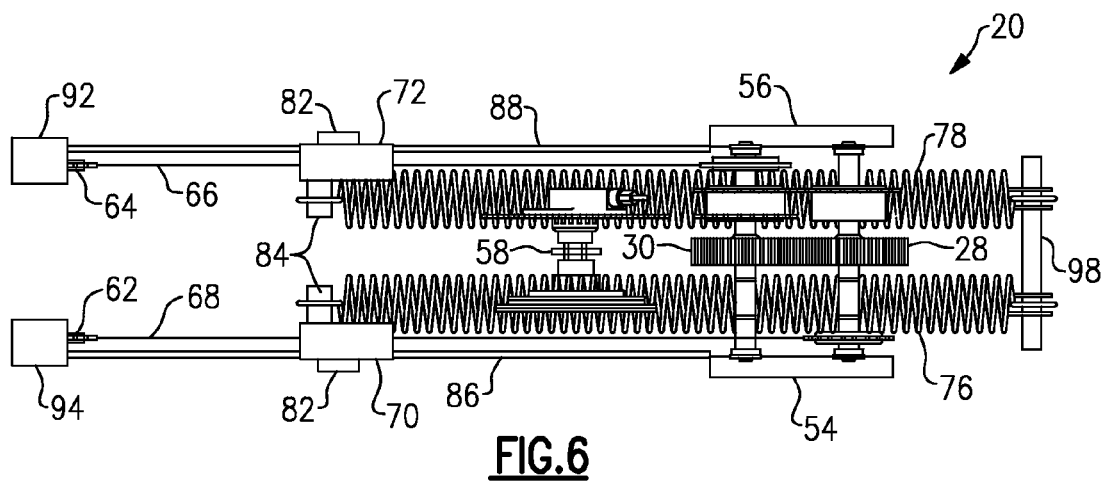
FIG. 6 is a top view of the drive mechanism and input device of FIG. 5.

FIG. 5 is a perspective view of the drive mechanism 20 with an example input device. The input device includes a first guide gear 62 mechanically linked to the first input gear 36 by a first input link 68 and a second guide gear 64 mechanically linked to the second input gear 38 by a second input link 66. The first input member 70 is attached to the first input link 68 by an input attachment 80 and the second input member 72 is attached to the second input link 66 by an input attachment 80. The first and second input members 70 and 72 include an attachment device 82 for receiving an input force and a pair of openings 74 for accepting a first and second pair of guide rails 86 and 88 (FIG. 6). The first and second guide gears 62 and 64 and the first and second input gears 36 and 38 may be sprockets or pulleys and the first and second input links 68 and 66 may be chains or belts, respectively.

A first end of a first spring 76 is attached to a spring link 84 on the first input member 70 and a first end of a second spring 78 is attached to the spring link 84 on the second input member 72.

FIG. 6 is a top view of the drive mechanism 20 and input device of FIG. 5. The first pair of guide rails 86 are attached to the first housing member 54 at a first end and to a first rail housing 94 at a second end and the second pair of guide rails 88 are attached to the second housing member 56 at a first end and to a second rail housing 92 at a second end. The first and second input members 70 and 72 move in a linear direction parallel to the first and second pair of guide rails 86 and 88. The first guide gear 62 and the second guide gear 64 are rotatably connected to the first and second rail housings 94 and 92, respectively. The first and second springs 76 and 78 are attached to the first and second input members 70 and 72 at the first end, respectively, and to the spring mounting member 98 at a second end. The first and second springs 76 and 78 are in tension throughout an entire stroke along the first and second pair of guide rails 86 and 88, respectively.

Figure 7:
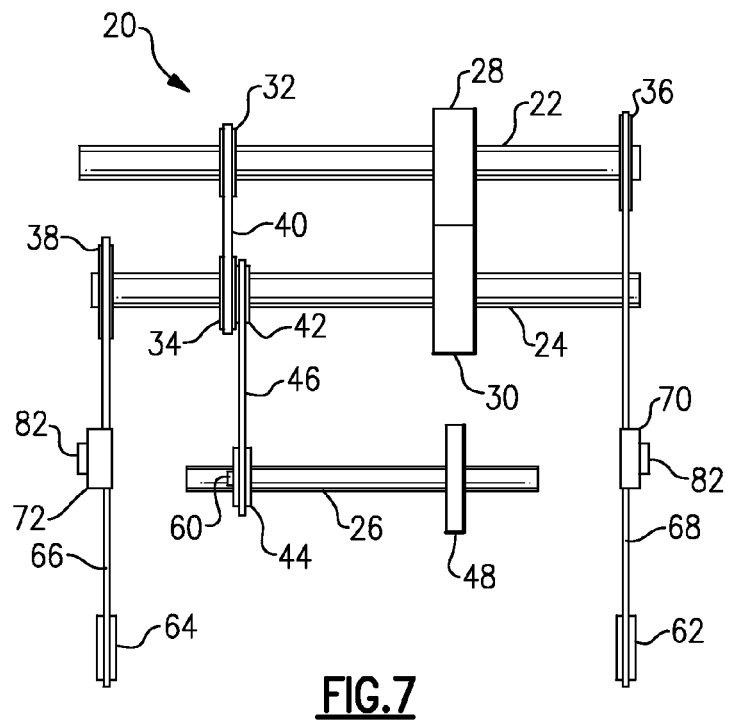
FIG. 7 is a schematic view of the example drive mechanism and input device of FIG. 5.

FIG. 7 is a schematic view of the example drive mechanism 20 and input device of FIG. 5. The first and second guide gears 62 and 64 are mechanically linked to the first and second input gears 36 and 38 by the first and second input links 68 and 66, respectively. The first and second input members 70 and 72 are attached to the first and second input links 68 and 66, respectively, and transfer a reciprocating linear input motion to the drive mechanism 20.

Figure 8:
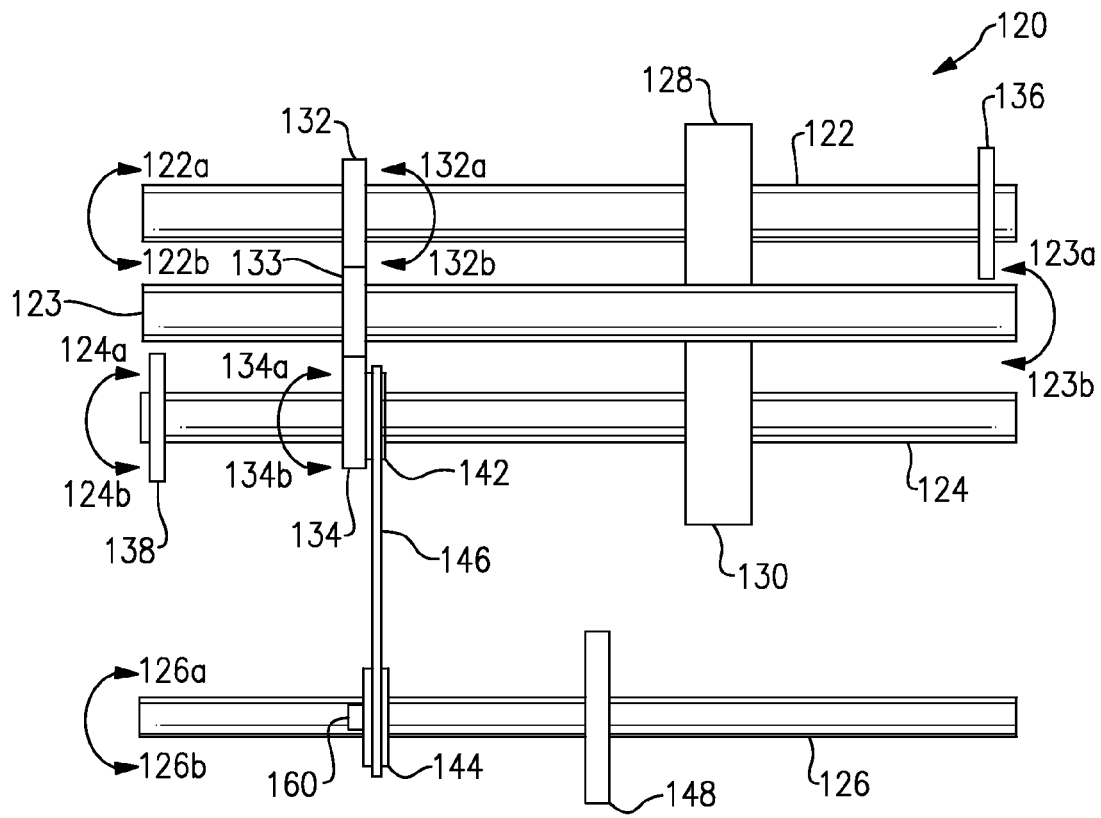
FIG. 8 is a top schematic view of another example drive mechanism.
Figure 9:
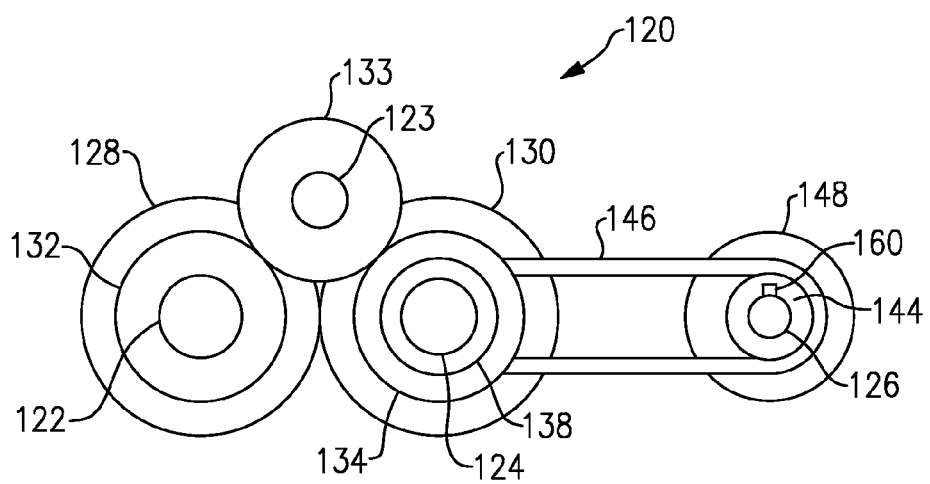
FIG. 9 is a side schematic view of the example drive mechanism of FIG. 8.

FIGS. 8 and 9 are another example drive mechanism 120. The drive mechanism 120 includes a first shaft 122, a second shaft 124, a third shaft 126, and an intermediate shaft 123. The intermediate shaft 123 includes a fixedly attached intermediate gear 133 that engages a first one-way gear 132 on the first shaft 122 and a second one-way gear 134 on the second shaft 124. An attachment gear 142 links the second one-way gear 134 with the third shaft 126.

When the first shaft 122 rotates in a first direction 122a, the second shaft rotates in a second direction 124b opposite the first direction 122a. The first shaft 122 and the second shaft 124 rotate in opposite directions because a first fixed gear 128 on the first shaft 122 engage a second fixed gear 130 on the second shaft 124. The first one-way gear 132 rotates in a first direction 132a with the first shaft 122, the intermediate gear 133 rotates in a second direction 123b, and the second one-way gear 134 rotates in a first direction 134a. The attachment gear 142 rotates in the first direction 134a with the second one-way gear 134 causing the third shaft 126 to rotate in a first direction 126a. In this example, the first one-way gear 132, the second one-way gear 134, and the intermediate gear 133 may be spur gears, helical gears, or other similar gears.

When the first shaft 122 rotates in a second direction 122b and the second shaft 124 rotates in a first direction 124a, the first one-way gear 132 rotates in the first direction 132a and free spins on the first shaft 122. The intermediate shaft 123 rotates in the second direction 123b causing the second one-way gear 134 rotates in the first direction 134a with the second shaft 124. The attachment gear 142 rotates in the first direction 134a with the second one-way gear 134 causing the third shaft 126 to rotate in the first direction 126a.

Figure 10:
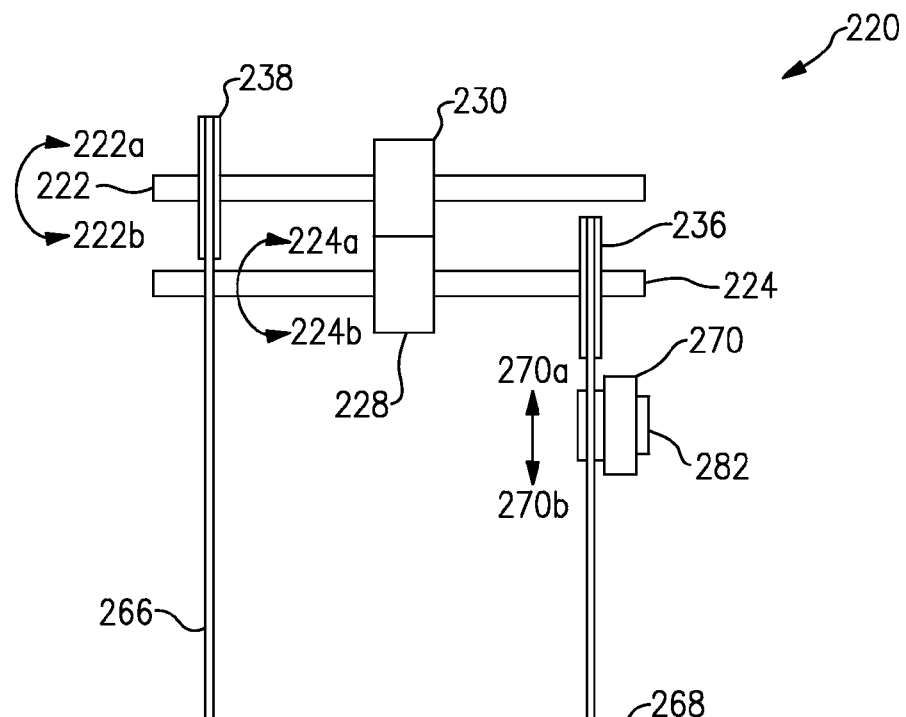
FIG. 10 is a schematic view another example drive mechanism.
Figure 10:
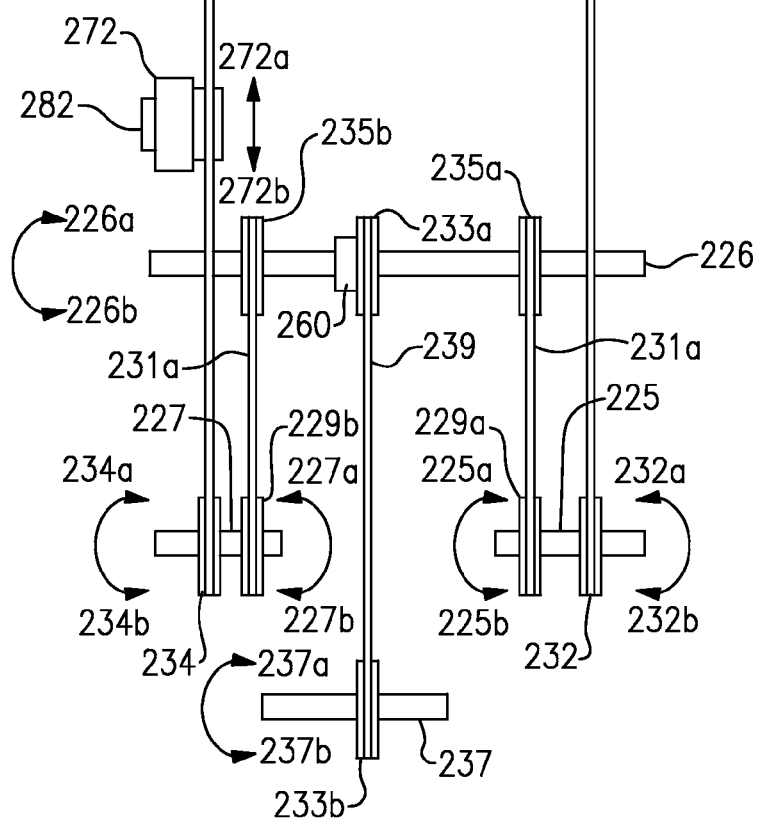

FIG. 10 is a schematic view of another example drive mechanism 220. The drive mechanism 220 includes a first shaft 224, a second shaft 222, a third shaft 226, a first intermediate shaft 225, a second intermediate shaft 227, and an axle 237. The first shaft 224 includes a first fixed gear 228 that engages a second fixed gear 230 on the second shaft 222. A first link 268 mechanically links a first input gear 236 on the first shaft 224 with a first one-way gear 232 on the first intermediate shaft 225. A second link 266 mechanically links a second input gear 238 on the second shaft 222 with a second one-way gear 234 on the second intermediate shaft 227.

The first and second fixed gears 228 and 230 may be spur gears, helical gears, or another suitable gear connection that would mechanically link the first shaft 224 and the second shaft 222 and cause the first shaft 224 and the second shaft 222 to rotate in opposite directions. The first and second input gears 236 and 238 and the first and second one-way gears 232 and 234 may be sprockets or pulleys and the first and second links 268 and 266 may be chains or belts, respectively.

A first fixed intermediate gear 229a is attached to the intermediate shaft 225 and mechanically linked to a first fixed drive gear 235a on the third shaft 226 by a first intermediate drive link 231a. A second fixed intermediate gear 229b is attached to the intermediate shaft 227 and mechanically linked to a second fixed drive gear 235b on the third shaft 226 by a second intermediate drive link 231b. The first and second fixed intermediate gears 229a and 229b and the first and second fixed drive gears 235a and 235b may be sprockets or pulleys and the first and second intermediate drive links 231a and 231b may be chains or belts, respectively.

The third shaft 226 includes a first drive gear 233a. The first drive gear 233a includes an optional release mechanism 260 that engages or disengages the first drive gear 233a from the third shaft 226. A drive link 239 mechanically links the first drive gear 233a to a second drive gear 233b on the axle 237. The first and second drive gears 233a and 233b may be sprockets or pulleys and the drive link 239 may be a chain or a belt, respectively.

When a first input member 270 moves in a first direction 270a and the second input member 272 moves in a second direction 270b, the first shaft 224 rotates in a first direction 224a and the second shaft 222 rotates in a second direction 222b. The first one-way gear 232 rotates in a first direction 232a causing the first intermediate shaft 225 and the first fixed intermediate gear 229a to rotate in a first direction 225a. The first and second fixed drive gears 235a and 235b and the first drive gear 233a rotate in a first direction 226a. The second drive gear 233b and the axle 237 rotate in a first direction 237a. The second one-way gear 234 rotates in a second direction 234b and free spins on the second intermediate shaft 227 while the second fixed intermediate gear 229b and the second intermediate shaft 227 rotate in a first direction 227a.

When a first input member 270 moves in a second direction 270b and the second input member 272 moves in a first direction 270a, the first shaft 224 rotates in a second direction 224b and the second shaft 222 rotates in a first direction 222a. The second one-way gear 234 rotates in a first direction 234a causing the second intermediate shaft 227 and the second fixed intermediate gear 229b to rotate in the first direction 227a. The first and second fixed drive gears 235a and 235b and the first drive gear 233a rotate in the first direction 226a. The second drive gear 233b and the axle 237 rotate in the first direction 237a. The first one-way gear 232 rotates in a second direction 232b and free spins on the first intermediate shaft 225 while the first fixed intermediate gear 229a and the first intermediate shaft 225 rotate in a first rotational direction 225a.

Disengaging a release mechanism 260 will allow the axle 237 to rotate freely in either the first direction 237a or a second direction 237b.

Figure 11:
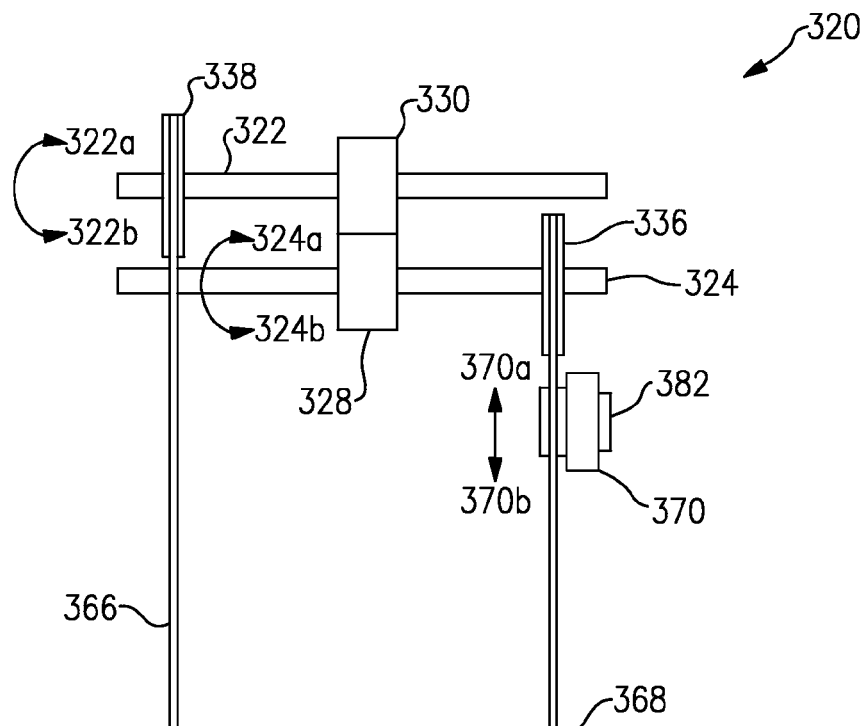
FIG. 11 is a schematic view another example drive mechanism.
Figure 11:
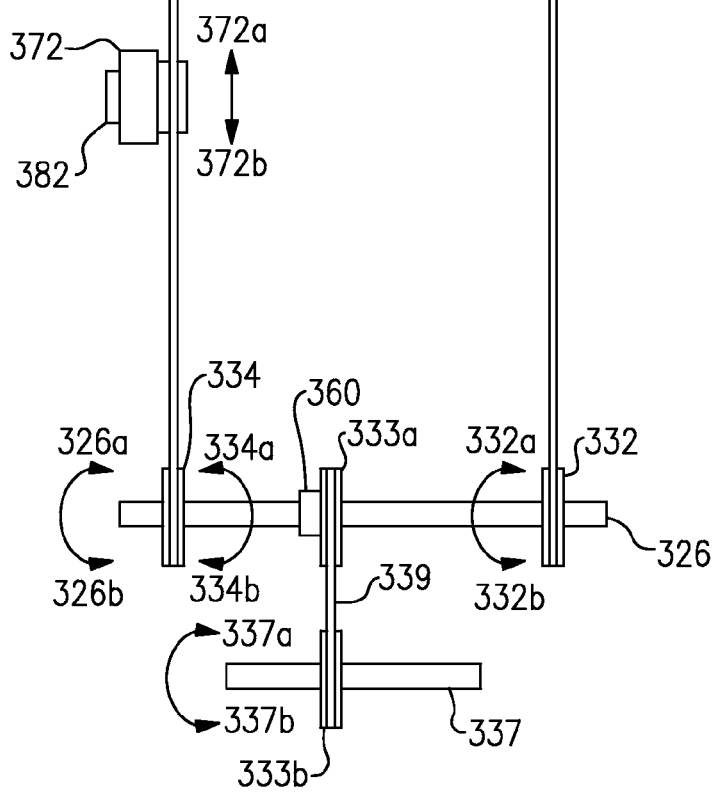

FIG. 11 is a schematic view of another example drive mechanism 320. The drive mechanism 320 includes a first shaft 324, a second shaft 322, a third shaft 326, and an axle 337. The first shaft 324 includes a first fixed gear 328 that engages a second fixed gear 330 on the second shaft 322. A first link 368 mechanically links a first input gear 336 on the first shaft 324 with a first one-way gear 332 on the third shaft 326. A second link 366 mechanically links a second input gear 338 on the second shaft 322 with a second one-way gear 334 on the third shaft 326. The third shaft 326 includes a first drive gear 333a having an optional release mechanism 360 for releasably engaging the first drive gear 333a with the third shaft 326. The first drive gear 333a is mechanically linked to a second drive gear 333b on the axle 337 by a drive link 339.

When a first input member 370 moves in a first direction 370a and a second input member 372 moves in a second direction 372b, the first shaft 324 rotates in a first direction 324a, and the second shaft rotates in a second direction 322b. The first one-way gear 332 rotates in a first direction 332a causing the third shaft 326 to rotate in a first direction 326a. The second one-way gear 334 rotates in a second direction 334b and free spins on the third shaft 326. The first drive gear 333a rotates in the first direction 326a causing the second drive gear 333b and the axle 337 to rotate in a first direction 337a.

When the first input member 370 moves in a second direction 370b and the second input member 382 moves in a first direction 372a, the first shaft 324 rotates in a second direction 324b and the second shaft 322 rotates in a first direction 322a. The second one-way gear 334 rotates in a first direction 334a causing the third shaft 326 to rotate in the first direction 326a. The first one-way gear 332 rotates in a second direction 332b and free spins on the third shaft 326. The first drive gear 333a rotates in the first direction 326a causing the second drive gear 333b and the axle 337 to rotate in the first direction 337a.

Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. A drive mechanism comprising:
   a first shaft including a first fixed gear and a first input gear fixed from rotation relative to the first shaft;
   a second shaft includes a second fixed gear and a second input gear fixed from rotation relative to the second shaft, the second fixed gear mechanically engages the first fixed gear to cause the first shaft to rotate in an opposite direction than the second shaft;
   a first linkage connecting the first shaft and a third shaft, the first linkage including a first one-way gear attached to the first shaft;
   a second linkage that connects the second shaft and the third shaft and includes a second one-way gear attached to the second shaft, wherein the third shaft produces a unidirectional rotational motion;
   a first linear input member mechanically linked to the first input gear on the first shaft; and
   a second linear input member is mechanically linked to the second input gear on the second shaft, wherein first linear input is mechanically linked to move in an opposite direction from the second linear input.

2. The drive mechanism of claim 1, including an attachment gear fixed to the second one-way gear and mechanically linked to the third shaft.

3. The drive mechanism of claim 1, wherein the first input member is located on at least one first rail and the second input member is located on at least one second rail.

4. The drive mechanism of claim 3, wherein the at least one first rail and the at least one second rail are linear.

5. The drive mechanism of claim 1, wherein the first input member is linked to a first spring and the second input member is linked to a second spring.

6. The drive mechanism of claim 1, wherein the first shaft is parallel to the second shaft.

7. The drive mechanism of claim 1, wherein the first shaft and the second shaft are parallel to the third shaft.

8. The drive mechanism of claim 1, wherein the first and second one-way gears are fixed from motion in a first direction and free to rotate in a second direction.

9. The drive mechanism of claim 1, wherein the first and second fixed gears are fixed from rotation relative to the first and second shafts.

10. The drive mechanism of claim 1, wherein the first one-way gear is mechanically linked to the second one-way gear.

11. The drive mechanism of claim 1, wherein the drive mechanism is located within a vehicle.

12. The drive mechanism of claim 1, wherein the second linkage includes an attachment gear engaging the second one-way gear and linked to the third shaft.

13. The drive mechanism of claim 1, wherein the first linear input member includes a first slider configured to slide on a first pair of linear rails and the second linear input member includes a second slider configured to slide on a second pair of linear rails.

14. The drive mechanism of claim 13, wherein the first slider is mechanically linked to a first input gear on the first shaft with a first input attachment member and the second slider is mechanically linked to a second input gear on the second shaft with a second input attachment member.

15. The drive mechanism of claim 14, wherein the first input attachment member forms a first loop and the second input attachment member each forms a second loop separate from the first loop.

16. A drive mechanism comprising:
   a first shaft including a first fixed gear and a first input gear fixed from rotation relative to the first shaft;
   a second shaft includes a second fixed gear and a second input gear fixed from rotation relative to the second shaft, the second fixed gear mechanically engages the first fixed gear to cause the first shaft to rotate in an opposite direction than the second shaft;
   a first one-way gear attached to the first shaft, wherein first one-way gear is configured to rotate freely in a first direction relative to the first shaft;
   a second one-way gear attached to the second shaft, wherein the second one-way gear is configured to rotate freely in the first direction relative to the second shaft and the first one-way gear is connected to the second one-way gear with a one-way gear link;
   an attachment gear fixed to the second one-way gear and configured to rotate with the second one-way gear;
   a first linear input mechanically linked to the first input gear on the first shaft; and a second linear input mechanically linked to the second input gear on the second shaft, wherein first linear input is configured to move in an opposite direction from the second linear input.

17. The drive mechanism of claim 16, wherein an output link connects the attachment gear to a drive gear on a third shaft.

18. The drive mechanism of claim 16, wherein the first linear input mechanism includes a first input member located on at least one first rail and the second linear input mechanism includes a second input member located on at least one second rail.

* * * * *